US005115342A

United States Patent [19]

Rowe et al.

[11] Patent Number: 5,115,342

[45] Date of Patent: May 19, 1992

[54] LAMINAR FLOW DUST SHIELD FOR WIDE ANGLE LENS

[75] Inventors: Norman R. Rowe, Chester; William R. Sweeney, Richmond, both of Va.

[73] Assignee: Philip Morris Incorporated, New York, N.Y.

[21] Appl. No.: 661,501

[22] Filed: Feb. 26, 1991

[51] Int. Cl.[5] ......................... B08B 5/02; G02B 23/16

[52] U.S. Cl. .................................... 359/509; 359/507; 15/405

[58] Field of Search ................................ 350/584, 582

[56] References Cited

U.S. PATENT DOCUMENTS

| | | | |
|---|---|---|---|
| 3,321,265 | 5/1907 | Clave et al. | 350/584 |
| 3,685,882 | 8/1972 | Van Der Jaqt | 350/63 |
| 3,696,230 | 10/1972 | Friedrich | 219/121 L |
| 4,240,691 | 12/1980 | Holmqvist et al. | 350/63 |
| 4,315,692 | 2/1982 | Heinecke et al. | 356/399 |
| 4,738,528 | 4/1988 | Craft | 356/43 |
| 4,784,491 | 11/1988 | Penney et al. | 350/584 |
| 4,786,188 | 11/1988 | Myhre et al. | 374/125 |
| 4,836,689 | 6/1989 | O'Brien et al. | 374/125 |

FOREIGN PATENT DOCUMENTS

| | | | |
|---|---|---|---|
| 39972 | 4/1957 | Poland | 350/584 |
| 1033940 | 6/1966 | United Kingdom | 350/584 |
| 1039955 | 8/1966 | United Kingdom | 350/584 |

*Primary Examiner*—Jon W. Henry
*Attorney, Agent, or Firm*—Karen G. Horowitz

[57] ABSTRACT

Apparatus for preventing the deposition of dust on a surface, for example, the transparent surface of an optical instrument, is provided. The apparatus includes a tube and a hollow porous frustrum. The surface is placed inside the tube. The small opening of the frustrum is placed adjacent the surface, and the large opening of the frustrum is sealed against the inner wall of the tube. Compressed gas is flooded into the tube, passes through the frustrum and sets up a laminar gas flow away from the surface, thus preventing the deposition of dust on the surface.

33 Claims, 10 Drawing Sheets

FIG. 7B
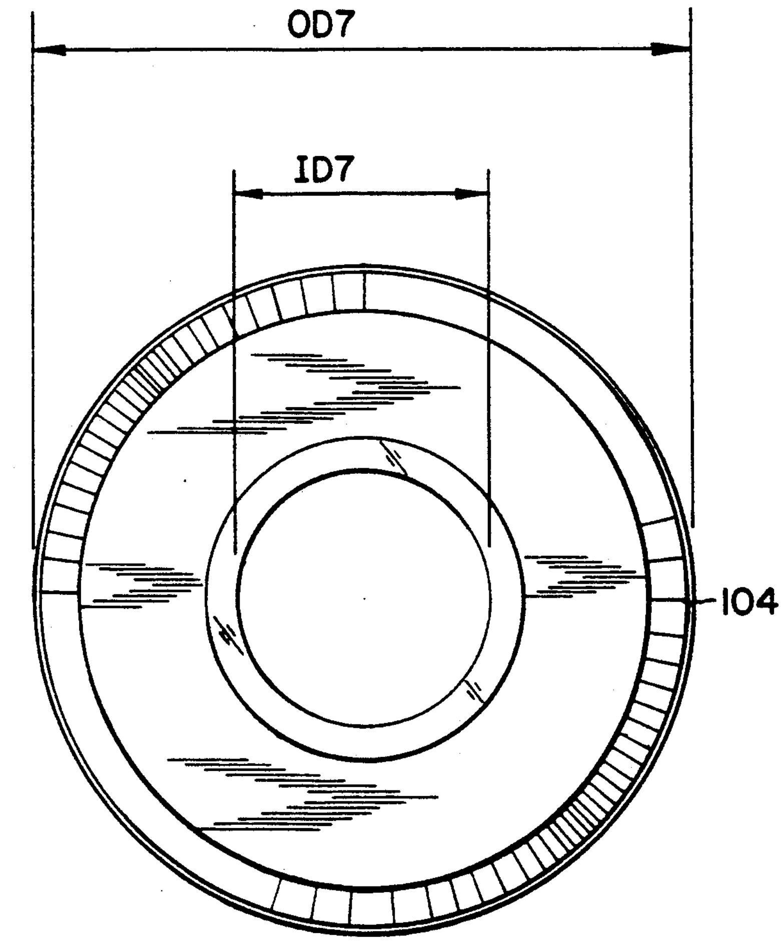
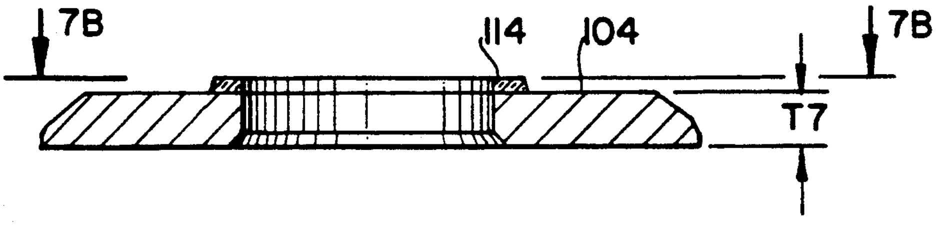
FIG. 7A

LAMINAR FLOW DUST SHIELD FOR WIDE ANGLE LENS

BACKGROUND OF THE INVENTION

The present invention relates to a device for preventing the deposition of particles on a selected surface, and more particularly to a device for preventing the deposition of dust on a camera lens or transparent surface.

Lenses provide the interface between the interior of optical instruments and the exterior environment. The lenses of optical instruments operating in dusty environments soon become covered with a layer of dust which hinders or disturbs the passage of light into the instrument, thus distorting or interfering with the optical signal or image received by the instrument. Lenses in such environments must therefore be cleaned frequently, but it is often not practical to do so. For example, where optical instruments are used to monitor certain phases in the automatic mass-production of goods, it may be necessary to stop production to clean the lenses. Such stoppage leads to loss of production and may lead to waste during the start-up or stopping of the mass-production machine.

One known technique for preventing dust settlement concerns the use of a cylindrical dust shield in which air is projected at a right angle to the plane of the lens forming a turbulent air flow across the lens. This technique is not entirely effective, and unacceptable amounts of dust coat the lens after about one hour in a heavy dust environment.

U.S. Pat. No. 4,240,691 refers to preventing dust settlement on a lens by placing the lens inside a tube and by introducing a laminar gas flow in the tube away from the lens. One problem with this technique is that the tube needs to be very long in relation to its diameter in order to obtain a laminar flow sufficient to minimize dust accumulation. This causes the field of view of the lens to be restricted.

Another known attempt at preventing dust deposition concerns placing the lens in a porous cylinder and raising the air pressure outside the cylinder so that air passes through the cylinder, is widely dispersed by the cylinder, and flows away from the lens. However, this technique is not satisfactory because high-velocity turbulent jets may develop and nullify the dust prevention process. These high-velocity turbulent jets may develop because of the potentially conflicting requirements of a laminar air flow which is both uniformly widely dispersed and ample. Widely dispersed laminar flow requires the use of a cylinder with very low porosity, and ample flow through the cylinder requires a large air pressure difference across it. Thus, there is a relatively high pressure gradient from the exterior to the interior of the cylinder, and any minor leakage regions that may be present will allow the air to escape rapidly. These leakage regions could arise if the cylinder is slightly damaged, non-uniform, or poorly seated.

Applicants have determined that the porous cylinder technique may be improved, and jets may be eliminated, by using a two-stage gas distribution system feeding a highly-porous cylinder. In this system, a first plenum having an annular outlet is used to reduce the pressure of the gas and to distribute it widely into a second plenum which, in turn, supplies the gas to the exterior of the cylinder. In this way, only a small pressure gradient exists from the exterior to the interior of the cylinder, and minor leaks do not affect the flow substantially. However, this technique still relies on a relatively long porous cylinder that unduly limits the field of view of the lens.

Accordingly, there is a continuing need for improvements in devices and methods for minimizing the deposition of dust on optical lenses having a broad range of fields of view, and in devices for maintaining such lenses sufficiently dust free for extended operation. There is also a need to provide such a device with a laminar gas flow without restricting the field of view of the lens.

SUMMARY OF THE INVENTION

It is, therefore, an object of this invention to provide a device for preventing the deposition of dust on a lens.

It is a further object to provide such a device with a uniformly-distributed laminar gas flow.

It is another object of the invention to provide such a device which uses a laminar gas flow provided by a two-stage gas distribution system in combination with a highly-porous diffuser.

It is yet another object of the invention to provide a dust shield for preventing the deposition of dust on a lens without restricting the field of view of the lens.

It is yet another object to provide a dust shield which can be adapted for use with lenses having widely varying fields of view.

These and other objects of the invention are accomplished by providing a dust shield in which gas is passed through a porous diffuser frustrum to provide a laminar gas flow to prevent the deposition of dust on the lens.

Broadly, one aspect of the invention concerns a tube having a first end and a second end, and a porous hollow diffuser frustrum inside the tube. The lens or transparent surface of an optical instrument is placed inside the tube and is aligned so that light can enter the optical instrument from the first end of the tube. The small opening of the diffuser frustrum is placed adjacent to the transparent surface, and the large opening of the diffuser frustrum is sealed against the opening at the first end of the tube. Compressed gas is flooded into the tube, between the tube and the frustrum, from the side of the diffuser frustrum closest to the second end of the tube. The gas passes through the diffuser frustrum and provides a laminar flow away from the transparent surface, thus minimizing the deposition of dust on the transparent surface. Preferably, the focal point of the optical instrument is placed close to the apex of the frustrum, so the field of view of the optical instrument can be as wide as the frustrum's apex angle. As used in this specification, the term "transparent surface" refers to any light receiving surface of a device for detecting or processing visible or non-visible light, including photosensitive solid state devices, lenses, filters, or other transparent windows.

Another aspect of the invention concerns a method for minimizing the accumulation of particles on a surface. The surface is secured interior to a hollow porous frustrum and gas is passed through the frustrum from the outside of the frustrum, thereby providing a laminar gas flow away from the surface without the use of a long tube.

BRIEF DESCRIPTION OF THE DRAWINGS

The above and other objects and advantages of the invention will be apparent upon consideration of the following detailed description, taken in conjunction with the accompanying drawings, in which like reference numerals refer to like parts throughout, and in which:

FIG. 7A shows a cross-sectional side view of the annulus of FIG. 1;

FIG. 7B shows a top view of FIG. 7A taken along line 7B—7B;

DETAILED DESCRIPTION OF THE INVENTION

Figure 1:
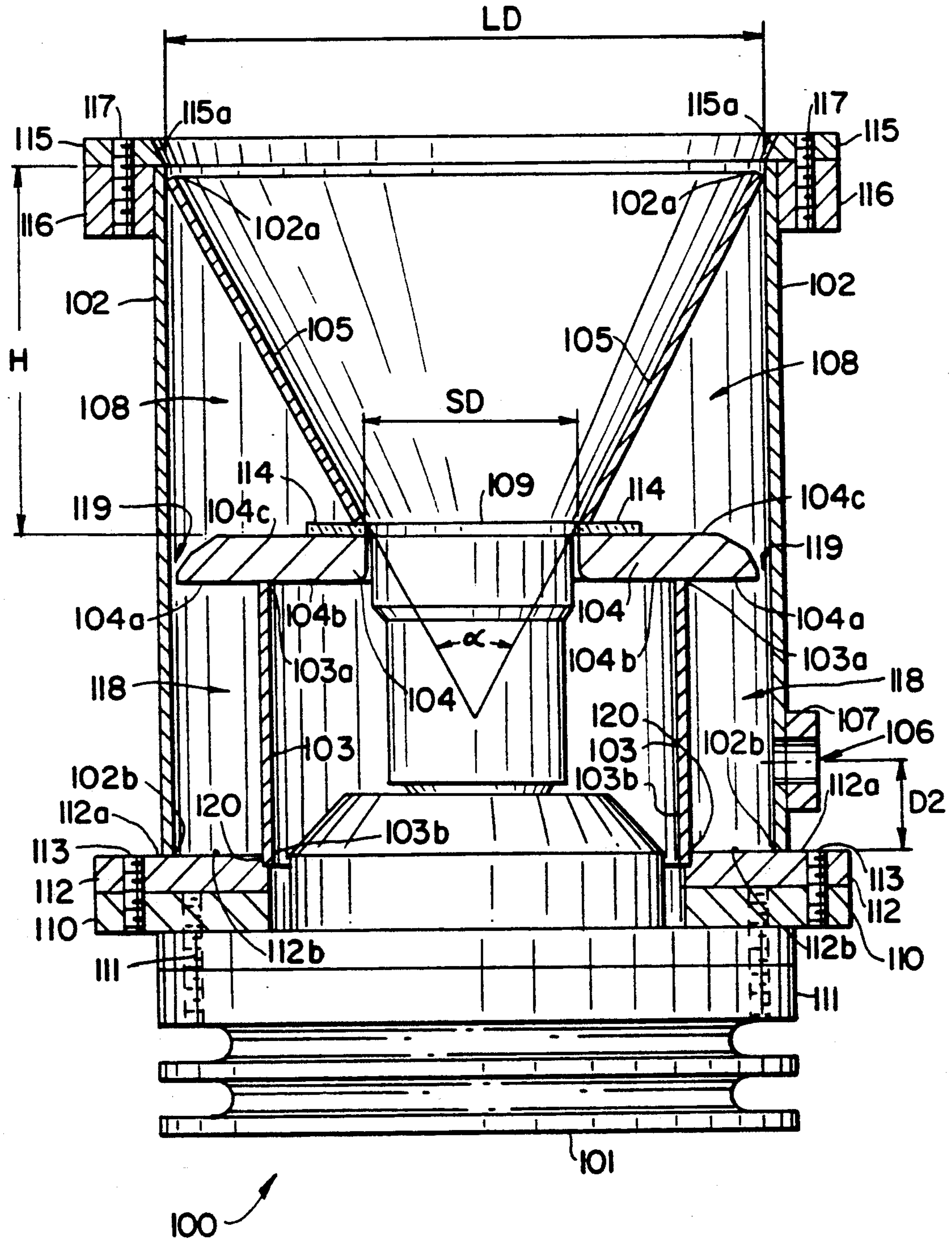
FIG. 1 shows a cross-sectional side view of a preferred embodiment of the present invention.

Referring to FIGS. 1-8, dust shield 100 is shown in accordance with a preferred embodiment of the present invention. Shield 100 includes outer tube 102 having a retaining ring 115 at end 102*a* and an annular flange 112 at end 102*b*, inner tube 103 having an annulus 104 at end 103*a* and flange 112 at end 103*b*, and hollow porous frustrum 105 retained between annulus 104 and retaining ring 115.

Figure 2B:
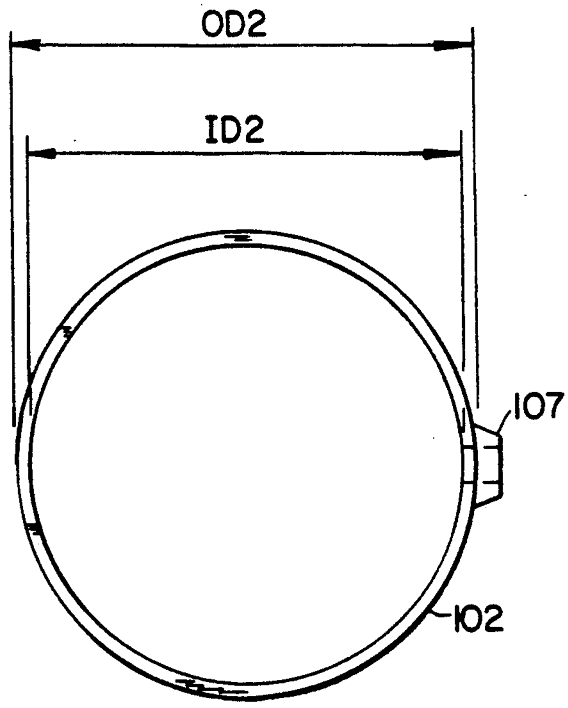
FIG. 2B shows a top view of FIG. 2A taken along line 2B—2B.
Figure 2A:
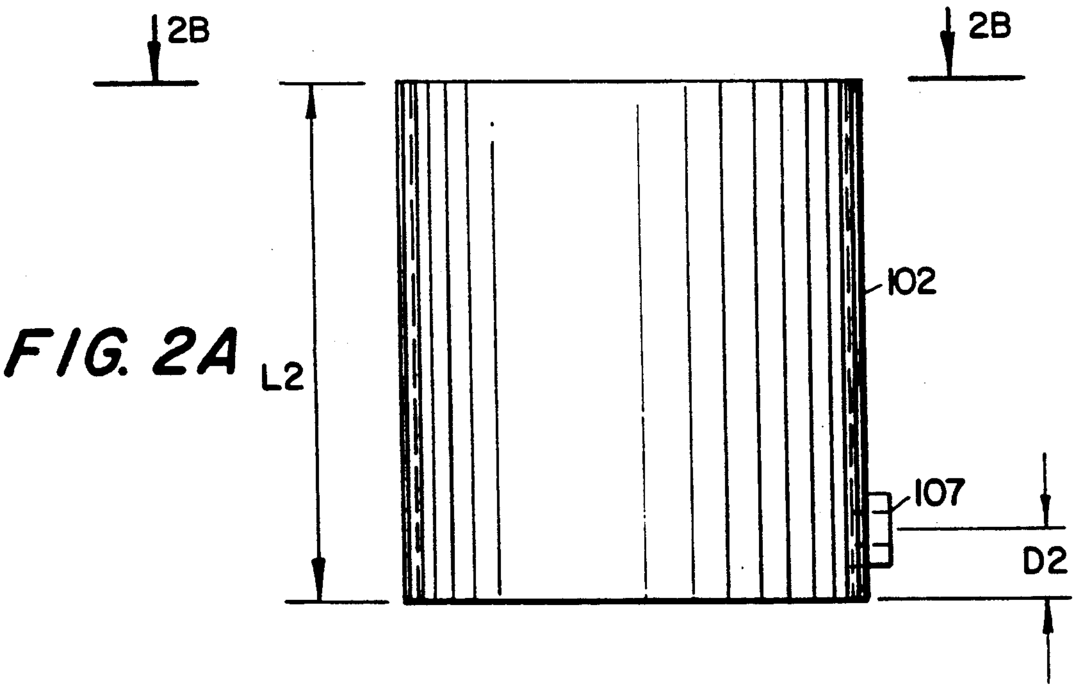
FIG. 2A shows a side view of the outer tube of FIG. 1 used to define the path of the laminar gas flow.

Referring to FIGS. 2A and 2B, tube 102 has length L2, inner diameter ID2, and outer diameter OD2. Preferably, length L2 is 7.03125 inches, inner diameter ID2 is 6 inches, and outer diameter OD2 is 6.5 inches. Tube 102 is preferably an extruded aluminum material, for example, #6061 round aluminum holobar.

Figure 3B:
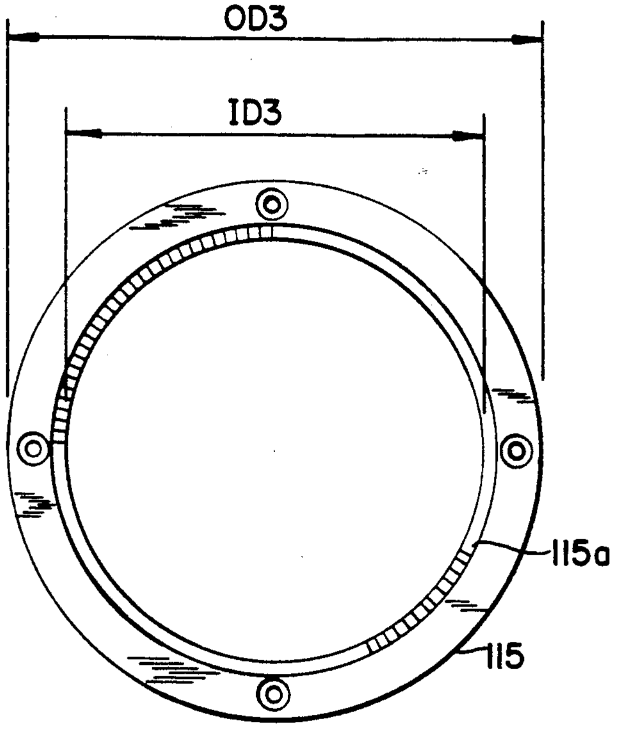
FIG. 3B shows a top view of FIG. 3A taken along line 3B—3B.
Figure 3A:
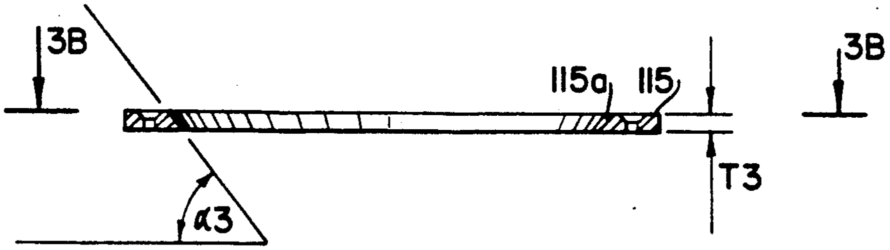
FIG. 3A shows a cross-sectional side view of the retaining ring of FIG. 1.
Figure 4B:
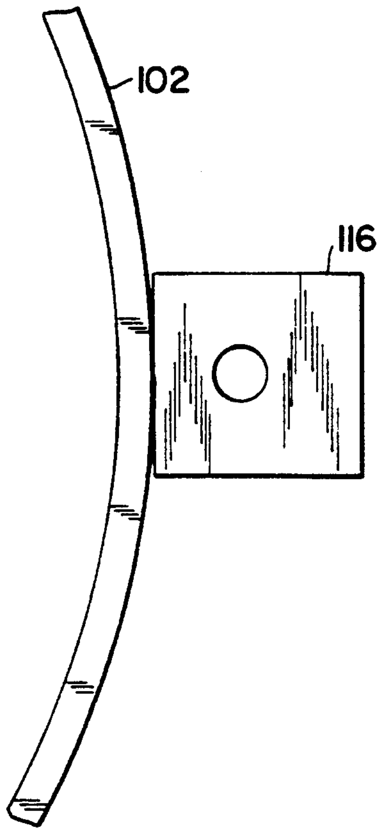
FIG. 4B shows a top view of FIG. 4A taken along line 4B—4B.
Figure 4A:
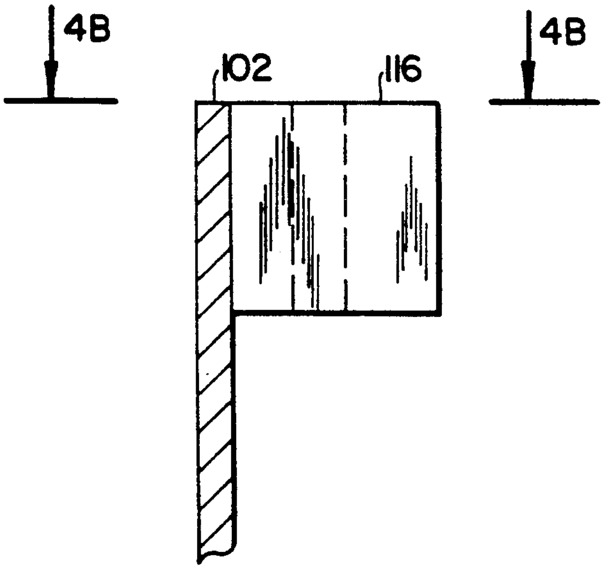
FIG. 4A shows a partial cross-sectional side view of the retaining ring mounting lug secured to the outer tube of FIG. 1.

Retaining ring 115 is secured to end 102*a* of tube 102 by screws 117 which fit into lugs 116 secured to the sides of tube 102. As shown in FIGS. 3A and 3B, ring 115 has thickness T3, inner diameter ID3, outer diameter OD3, and bevel angle α3. Preferably thickness T3 is 0.25 inches, inner diameter ID3 is 5.875 inches, outer diameter OD3 is 8 inches, angle α3 is 45 degrees, and ring 115 is made from the same material as tube 102. Preferably, four retaining ring mounting lugs 116 made from the same material as tube 102 are spaced equidistantly around, and welded to, tube 102 as shown in FIGS. 4A and 4B.

Figure 5B:
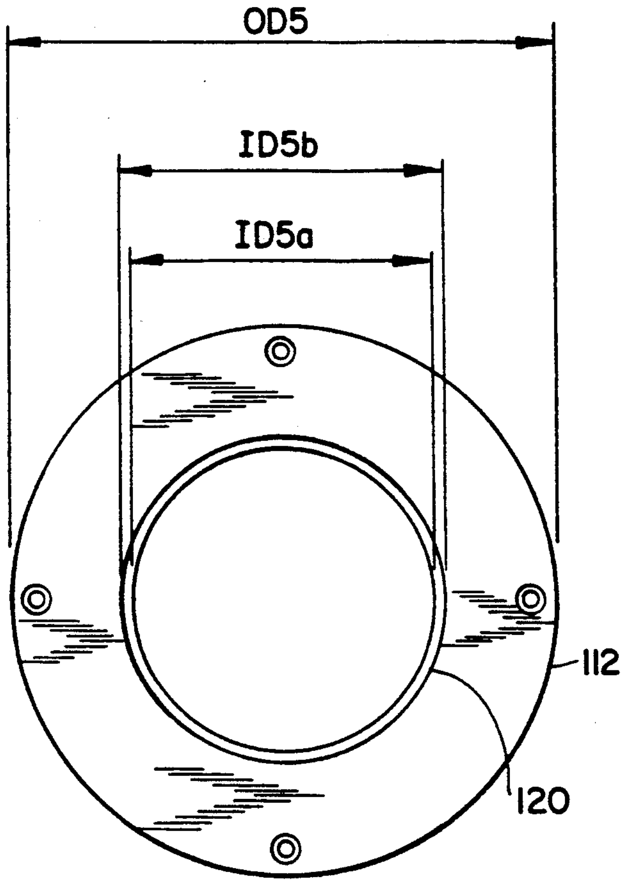
FIG. 5B shows a top view of FIG. 5A taken along line 5B—5B.
Figure 5A:
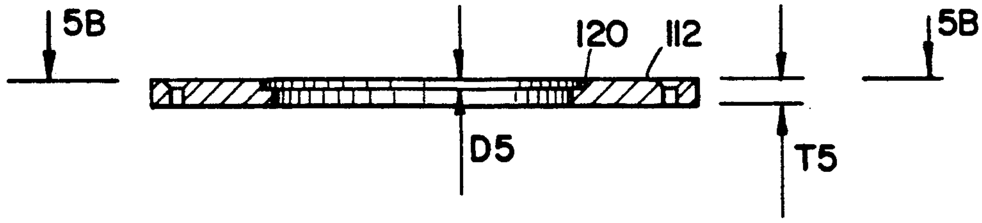
FIG. 5A shows a cross-sectional side view of the first flange of FIG. 1.

Flange 112 is secured to end 102*b* of tube 102 so that a first portion 112*a* extends outwardly from tube 102 and a second portion 112*b* extends inwardly from tube 102. As shown in FIGS. 5A and 5B, flange 112 has thickness T5, first inner diameter ID5*a*, second inner diameter ID5*b*, outer diameter OD5, and ledge depth D5. Preferably, thickness T5 is 0.375 inch, inner diameter ID5*a* is 4.375 inches, outer diameter ID5*b* is 4.5625 inches, outer diameter OD5 is 8 inches, and depth D5 is 0.125 inches. Flange 112 is preferably secured to tube 102 by welding, and is made from the same material as tube 102.

Figure 6B:
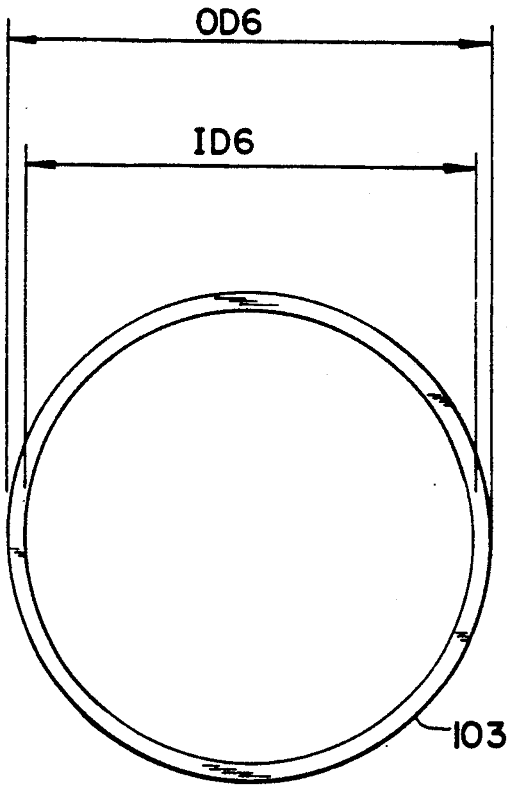
FIG. 6B shows a top view of FIG. 6A taken along line 6B—6B.
Figure 6A:
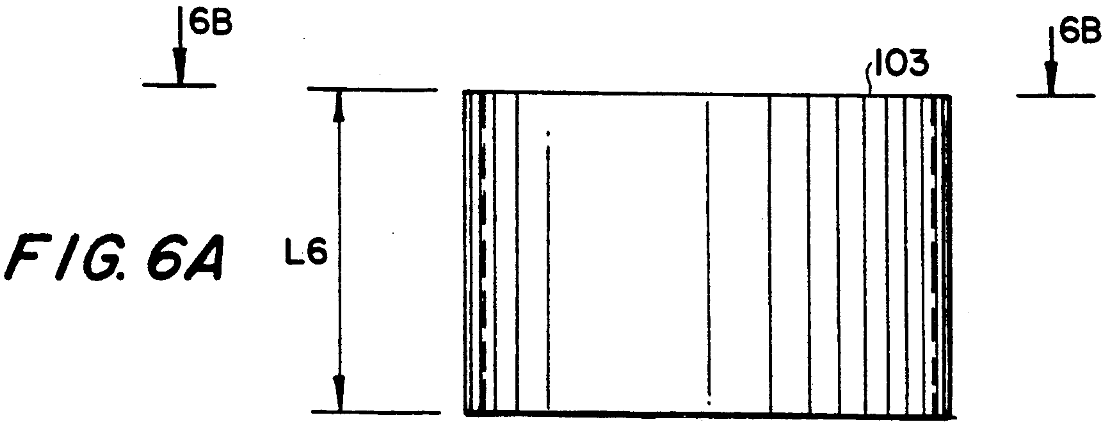
FIG. 6A shows a side view of the inner tube of FIG. 1.

Referring to FIGS. 1, 6A, and 6B, tube 103 has a first end 103*a*, a second end 103*b*, length L6, inner diameter ID6, and outer diameter OD6. Preferably, length L6 is 3.03125 inches, inner diameter ID6 is 4 inches, and outer diameter OD6 is 4.5 inches. Tube 103 is preferably an extruded tube made of the same material as tube 102.

Figure 9A:
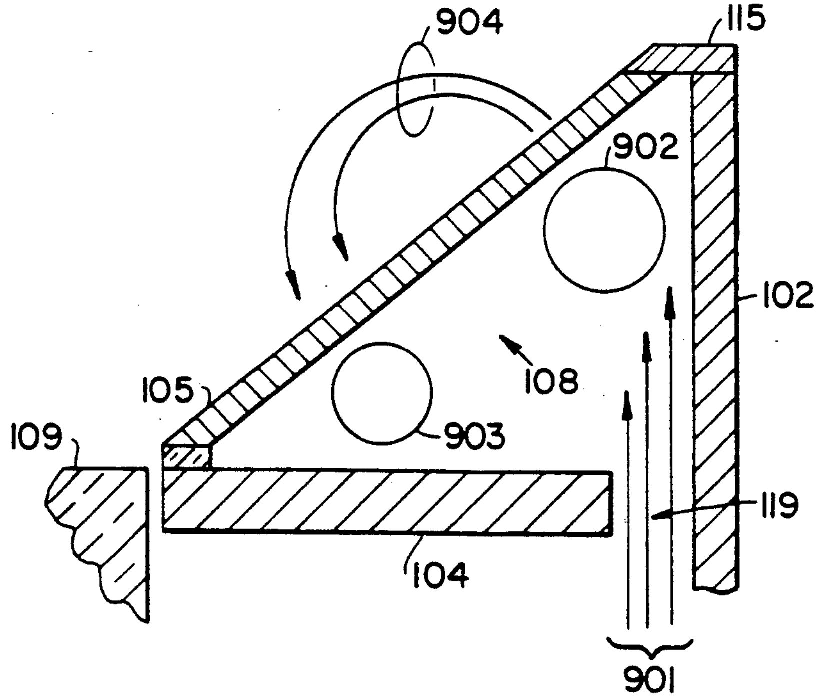
FIGS. 9A and 9B respectively show partial cross-sections of two alternative embodiments of a gas inlet for the embodiment of FIG. 1.

Annulus 104 is attached to end 103*a* of tube 103 in such a way that a first portion 104*a* extends outwardly from tube 103 and a second portion 104*b* extends inwardly from tube 103. Referring to FIGS. 7A and 7B, annulus 104 has thickness T7, inner diameter ID7, and outer diameter OD7. Preferably, thickness T7 is 0.5 inches, inner diameter ID7 is 2.25 inches, and outer diameter OD7 is 5.75 inches. The shape of annulus 104 in accordance with alternative embodiments of the present invention are described further below in connection with FIGS. 9A, 9B, and 10. Annulus 104 is preferably welded to, and made of the same material as, tube 102. Silicone torus seal 114 is attached to face 104*c* of annulus 104 to ensure an air-tight seal to the boundary of transparent surface 109 and to prevent turbulent air jets from forming near surface 109.

End 103*b* of tube 103 is secured to ledge 120 of flange 112 so that tube 103 is concentric with and parallel to outer tube 102.

Tubes 102 and 103, inner portion 112*b* of flange 112, and outer portion 104*a* of annulus 104 form gas plenum 118. Preferably, plenum 118 has an annular shape, so that gas passing through it has an annular distribution. Boss 107 is welded to the outside of tube 102 at a distance D2 from flange 112 as shown in FIGS. 2A and 2B. Boss 107 is preferably made of the same material as tube 102. Gas can be introduced into plenum 118 through inlet 106 which is drilled through boss 107 and tube 102.

Hollow, porous diffuser frustrum 105 is held inside tube 102 against seal 114 on annulus 104 by retaining ring 115. Retaining ring 115 has a beveled surface 115*a* so that it is sufficiently strong to hold frustrum 105, but does not restrict the field of view more than frustrum 105 does. Frustrum 105 can be made of any porous material, such as sintered brass or one or more layers of mesh screen which may be welded or bonded to yield a rigid frustrum. The porosity of frustrum 105 can be selected from the range of 25% to 35%. In the preferred embodiment, frustrum 105 comprises six layers of screen superimposed and in touching contact, having three layers of 80 mesh stainless steel screen, one layer of 100 mesh stainless steel screen, and two layers of 40 or 60 mesh stainless steel screen. The order in which the mesh layers are assembled does not affect the invention's performance substantially, but to impart maximum strength, the frustrum is preferably assembled with the largest mesh on the outer surface of the frustrum. Frustrum 105 has height H, large diameter LD, small diameter SD, and apex angle α as shown in FIG. 1. Preferably height H is 3.625 inches, large diameter LD, small diameter SD, is 6.34375 inches, and small diameter is 2.25 inches. Angle $\alpha$ is selected in the range of 35 to 75 degrees, and is preferably 54 degrees, so as to accommodate the required field of view of lens or transparent surface 109.

Figure 8B:
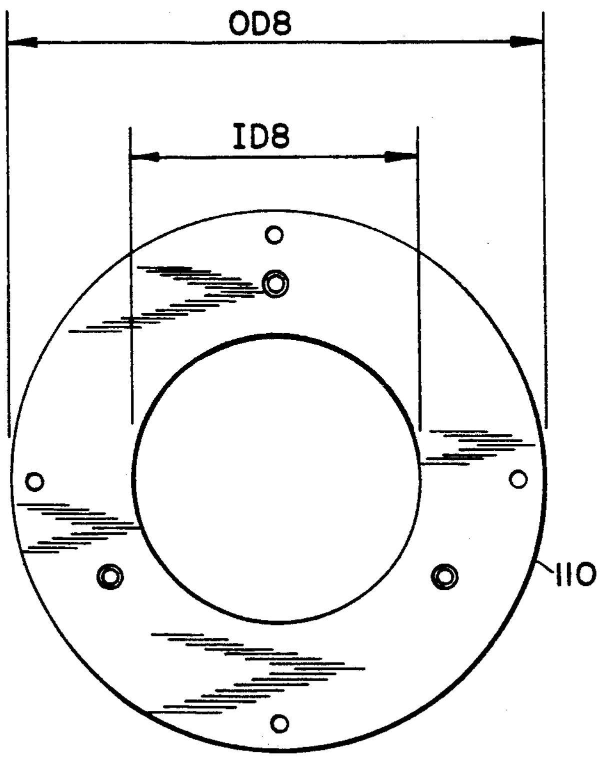
FIG. 8B shows a top view of FIG. 8A taken along line 8B—8B.
Figure 8A:
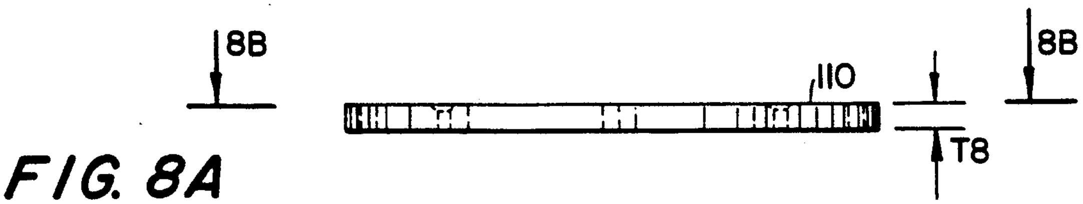
FIG. 8A shows a side view of the second flange of FIG. 1.

Flange 110 forms a mount for shield 100, and is secured to optical instrument 101 by screws 111. As shown in FIGS. 8A and 8B, flange 110 has thickness T8, inner diameter ID8, and outer diameter OD8. Preferably, thickness T8 is 0.375 inches, inner diameter ID8 is 4.375 inches, and outer diameter OD8 is 8 inches.

Flange 112 is secured to flange 110 by screws 113. While being so secured, shield 100 is positioned such that annulus 104 fits over transparent surface 109 with face 104*c* substantially flush with the bounded outer surface of transparent surface 109.

Broadly, shield 100 is used in the following manner: Compressed gas is passed through inlet 106 of boss 107 into plenum 118. Outer diameter OD7 of annulus 104 is a predetermined length less than inner diameter ID2 of tube 102, thus forming annular inlet 119. The gas flows out of plenum 118 through annular inlet 119 into plenum 108. It then passes through diffuser frustrum 105 and forms a laminar gas flow away from transparent surface 109. This gas flow prevents dust particles from reaching surface 109, thus preventing the deposition of dust on this surface.

In order to obtain the necessary laminar gas flow, the combination of diffuser frustrum material and compressed gas pressure must be chosen appropriately. Preferably compressed air is used, although other gases such as nitrogen could also be used. If compressed air is used, it is supplied to inlet 106 at a pressure in the range of 3 to 15 p.s.i.g., and preferably at 10 p.s.i.g. It has been found that a prototype device using air pressure in a range from 3 to 15 p.s.i.g. and the preferred diffuser frustrum material having a porosity in a range from 25% to 35% provided a suitable laminar air flow. With these embodiments, no dust or discoloration was visible to the naked eye on a white lens cleaning paper that was used to wipe the lens after it had been used for more than 200 hours in a dusty environment. Other combinations of diffuser frustrum material and compressed air pressure are possible, providing that a proper flow of air is maintained, and that the flow remains laminar. If the air flow becomes turbulent, pockets of stationary air can be formed which allow dust to settle, or vortices may form which promote rather than prevent dust deposition.

The effect of annular inlet 119 is to disperse gas widely into plenum 108, and at the same time to reduce the pressure of the gas. Because the gas is widely dispersed at a low pressure in plenum 108, frustrum 105 can be highly-porous so that ample gas flow can be sustained with only a small pressure gradient, and minor leaks will not affect the gas flow substantially. Thus, the reduced gas pressure in plenum 108 eliminates undesirable dust depositing effects such as high-velocity turbulent jets through small leakage regions.

The distribution of gas flow into plenum 108 may be controlled by selecting the cross-sectional shape of annulus 104 at annular inlet 119. Inappropriate choice of this shape may promote rather than prevent the deposition of dust. For example, referring to FIG. 9A, an embodiment of annulus 104 having a rectangular cross-section is shown. This shape provides an undesirable gas flow from inlet 119 into plenum 108 that is substantially linear as indicated by arrows 901, and may lead to a relatively high gas pressure in region 902 and a relatively low gas pressure in region 903. Consequently, an undesirable back-circulation of gas may be established, as indicated by arrows 904, and this tends to promote, rather than prevent, the deposition of dust on frustrum 105 and transparent surface 109.

Figure 9B:
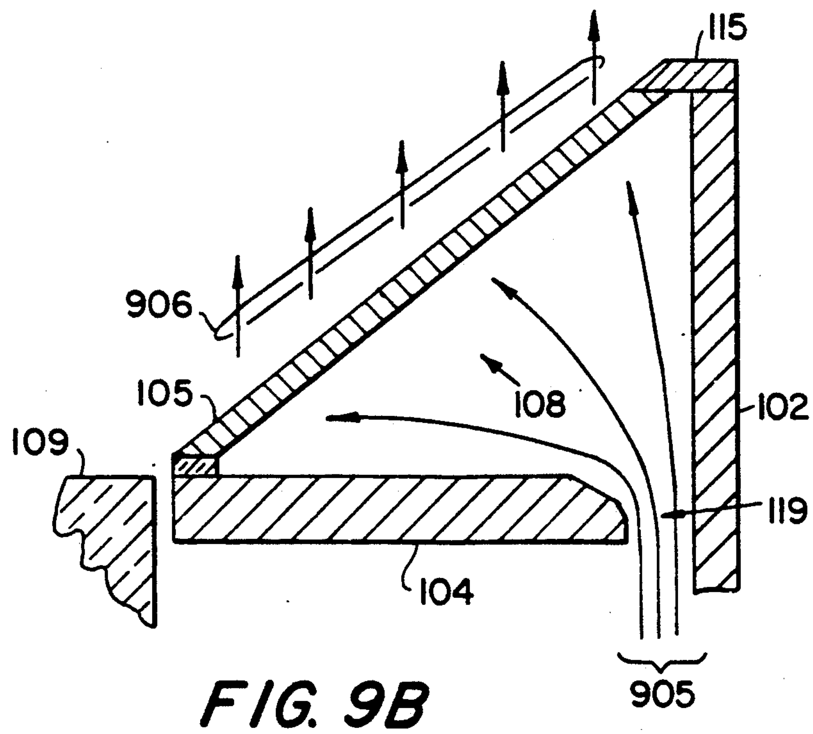

In contrast, in accordance with a preferred embodiment of the present invention shown in FIG. 9B, the deposition of dust may be prevented by the use of a contoured annulus, more preferably a contoured cross-section shaped to utilize the Coanda effect. The cross-sectional shape of annulus 104 tends to bend the gas flow, as indicated by arrows 905, so that the gas pressure on frustrum 105 is uniform. Laminar gas flow away from frustrum 105 is thus obtained as indicated by arrows 906, and no back-circulation occurs. This prevents the settlement of dust.

Figure 10:
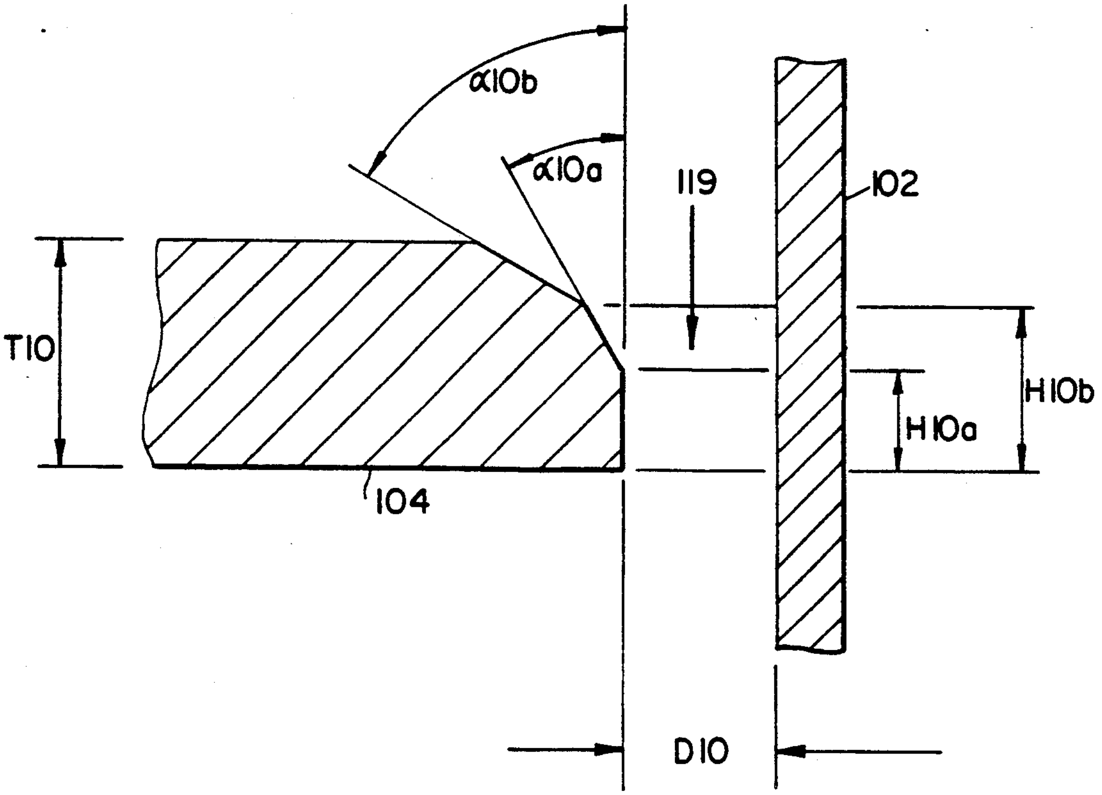
FIG. 10 shows an enlarged partial cross-section of the Coanda effect surface of FIG. 9B.

Part of the cross-section of a preferred embodiment of annulus 104 of FIG. 9B is shown in FIG. 10. The cross-section is contoured to utilize the Coanda effect. The edge of the annulus has two bevels, a lower bevel at an angle $\alpha 10a$ to the normal plane of annulus, and an upper bevel at an angle $\alpha 10b$ to the normal to the plane of the annulus. The lower edges of the lower and upper bevels are at height H10*a* and height H10*b* above the lower face of annulus 104 respectively. Annulus 104 has thickness T10, and is located distance D10 away from the inner wall of tube 102. Preferably, angle $\alpha 10a$ is 26 degrees, angle $\alpha 10b$ is 58 degrees, height H10*a* is 0.125 inches, height H10*b* is 0.28125 inches, thickness T10 is 0.5 inches, and distance D10 is 0.125 inches. Alternative Coanda effect surfaces could be used. For example, an annulus with a smoothly curved cross section, or one with a plurality of bevels could be used.

Shield 100 is preferably assembled in the following order: Annulus 104 is welded to tube 103. Tube 103 is welded to flange 112. Boss 107 is welded to tube 102. Boss 107 and tube 102 are drilled and tapped for 0.25 inches NPT. Four mounting lugs 116 are welded to tube 102, equally spaced at 90 degrees. Tube 102 is welded to flange 112 maintaining a uniform 0.125 inch gap between annulus 104 and tube 102. Flange 110 is screwed to optical instrument 101. Frustrum 105 is inserted into tube 102. Flange 112 is screwed to flange 110. Retaining ring 115 is screwed to mounting lugs 116. All welds should be kept as small as practical, consistent with good practice, and any weld splatter should be removed.

Thus, a dust shield for preventing the deposition of dust on the light receiving surface of an optical instrument, specifically a transparent light-gathering lens surface, is provided. Although shield 100 is depicted and described with reference to a certain orientation, it should be understood that the invention may be operated equally effectively in other orientations. One skilled in the art will appreciate that the present invention can be practiced by other than the described embodiments, which are presented here for purposes of illustration and not of limitation, and the present invention is limited only by the claims that follow.

What is claimed is:

1. Apparatus for preventing the deposition of particles on a surface to be kept clean comprising:

a first plenum having a gas distribution outlet;

a second plenum having a gas inlet and a porous gas distribution outlet, the gas inlet being in gaseous communication with the gas distribution outlet of the first plenum, the porous gas distribution outlet being a hollow porous frustrum disposed about the surface to be kept clean; and means for introducing gas into the first plenum, thereby to provide a widely-dispersed, uniformly-distributed flow of gas through the porous gas outlet away from the surface to be kept clean.

2. The apparatus of claim 1 wherein the gas distribution outlet of the first plenum and the gas inlet of the second plenum further comprise an annular aperture having a Coanda effect surface on the interior of the annular aperture.

3. The apparatus of claim 2 wherein the gas introduced into the first plenum is at a first relative pressure and the gas distributed into the second plenum is at a second relative pressure, the first relative pressure being greater than the second relative pressure, and the Coanda effect surface provides a laminar gas flow through the porous gas distribution outlet.

4. The apparatus of claim 3 wherein the hollow porous frustrum has a porosity in the range of from 25% to 35%.

5. The apparatus of claim 1 wherein the second plenum further comprises a non-porous tube and the hollow porous frustrum, the frustrum having a wide end and a narrow end, the frustrum being secured interior to the tube with the wide end being secured in contact with the tube and the narrow end being secured in contact with the surface to be kept clean whereby the gas inlet of the second plenum is between the frustrum and the tube proximate to the surface to be kept clean.

6. A method for preventing the deposition of particles on a surface to be kept clean comprising the steps of:

providing a first plenum having a gas inlet and a gas distribution outlet;

providing a second plenum having a gas inlet and a porous gas distribution outlet, the gas distribution outlet of the first plenum being connected to the gas inlet of the second plenum, the porous gas distribution outlet being a hollow porous frustrum disposed about the surface to be kept clean;

introducing gas into the first plenum and distributing the gas through the first plenum; and dispersing gas from the outlet of the first plenum through the inlet of the second plenum producing a widely-dispersed, uniformly-distributed flow of gas through the porous gas distribution outlet away from the surface to be kept clean.

7. The method of claim 6 wherein dispersing the gas further comprises passing the gas over a Coanda effect surface.

8. Apparatus for preventing the deposition of particles on a bounded surface of an optical instrument having a field of view, the apparatus comprising:

a first tube having an inner wall, an interior dimension, a first opening, and a second opening, the bounded surface being placed within the tube and the optical instrument aligned so that light entering the first opening strikes the bounded surface;

a hollow porous frustrum having a narrow opening and a wide opening, the wide opening being substantially the same size as the interior dimension of the tube, the frustrum being secured inside the tube with the narrow opening between the first and second openings of the tube and proximate to the bounded surface, and the wide opening being secured to the inner wall at the first opening of the tube so that the field of view of the optical instrument is not restricted by the frustrum; and means for distributing gas into the tube from the side of the frustrum nearest the second opening of the tube so that the gas passes through the frustrum, thereby to provide a laminar gas flow away from the bounded surface.

9. The apparatus of claim 8 wherein the means for distributing gas further comprises an annular plenum having a gas outlet including an opening, an interior surface, and an exterior surface, the interior surface having a first dimension that is adjacent to the outer edge of the optical instrument, the exterior surface having a second dimension that is a predetermined amount less than the interior dimension of the tube and is larger than the first dimension, and means for mounting the annular plenum so that the interior surface is adjacent the optical instrument and the exterior surface is uniformly spaced from the inner wall of the tube by the predetermined amount.

10. The apparatus of claim 9 wherein the exterior surface of the annulus further comprises a Coanda effect surface.

11. The apparatus of claim 10 wherein the Coanda effect surface further comprises at least one bevel at an angle relative to the plane of the bounded surface.

12. The apparatus of claim 10 wherein the Coanda effect surface further comprises a first bevel and a second bevel at respective first and second angles relative to the plane of the bounded surface.

13. The apparatus of claim 12 wherein the Coanda effect surface further comprises a first bevel at an angle of 58 degrees to the normal to the plane of the bounded surface and a second bevel at an angle of 26 degrees to the normal to the plane of the bounded surface, the first bevel being interior to and contiguous with the second bevel.

14. The apparatus of claim 8 wherein the hollow porous frustrum has a porosity in the range of from 25% to 35%.

15. The apparatus of claim 8 wherein the hollow porous frustrum defines a cone having an apex angle, and the apex angle is selected from among the range of between 35 and 75 degrees.

16. The apparatus of claim 15 wherein the apex angle is 54 degrees.

17. The apparatus of claim 8 wherein the frustrum further comprises three layers of 80 mesh stainless steel screen, one layer of 100 mesh stainless steel screen, and two layers of 40 mesh stainless steel screen.

18. The apparatus of claim 8 wherein the frustrum further comprises six layers of 80 mesh stainless steel screen.

19. The apparatus of claim 8 wherein the frustrum further comprises sintered brass.

20. The apparatus of claim 8 wherein the gas comprises compressed air at a pressure selected from among the range of between 3 and 15 p.s.i.g.

21. A method of minimizing the deposition of dust on a bounded surface of an optical instrument having a field of view comprising the steps of:

providing a tube having an inner wall, an interior dimension, a first opening, and a second opening;

providing a frustrum having a narrow opening and a wide opening, the wide opening being substantially the same size as the interior dimension of the tube;

securing the frustrum inside the tube so that the wide opening is adjacent the inner wall at the first end of the tube and the narrow opening is between the first and second openings of the tube;

securing the narrow end of the frustrum to the optical instrument so that the field of view of the bounded surface is not restricted by the frustrum;

introducing gas into the tube from the side of the frustrum nearest the second opening of the tube so that the gas passes through the frustrum, thereby to provide a laminar gas flow away from the bounded surface.

22. Apparatus for minimizing the deposition of particles on a transparent surface of an optical instrument having a field of view comprising:

a chamber further comprising a first tube and a hollow porous frustrum, the tube having an interior dimension, a first open end, a second open end, and a gas flow path therethrough, the second end having a dimension for receiving the bounded surface, the hollow porous frustrum having a narrow opening and a wide opening, the narrow opening having a dimension corresponding to the bounded surface, the wide opening corresponding to the interior dimension of the first end of the tube, the frustrum being placed inside the tube so that the narrow opening is interior to the tube and the wide opening is secured to the tube interior proximate the first end of the tube and the frustrum does not restrict the field of view; and a plenum for distributing gas into the chamber between the frustrum and the tube from the second end of the tube so that the gas will flow through the frustrum, thereby to provide a laminar gas flow interior to the frustrum away from the narrow end of the frustrum.

23. The apparatus of claim 22 wherein the plenum further comprises an annulus having an interior surface and an exterior surface, the interior surface having a dimension that corresponds to the bounded surface, the exterior surface having a dimension that is a predetermined amount less than the interior dimension of the second end of the tube, the second dimension being greater than the first dimension, and means for mounting the annulus to the narrow end of the frustrum so that the exterior surface is uniformly spaced from the interior dimension of the second end of the tube by the predetermined amount.

24. The apparatus of claim 23 wherein the exterior surface of the annulus further comprises a Coanda effect surface.

25. The apparatus of claim 24 wherein the Coanda effect surface further comprises at least one bevel at an angle relative to the plane of the bounded surface.

26. The apparatus of claim 24 wherein the Coanda effect surface further comprises a first bevel and a second bevel, the first and second bevels being at different angles relative to the plane of the transparent surface.

27. The apparatus of claim 26 wherein the first bevel is at an angle of 58 degrees to the normal to the plane of the transparent surface and the second bevel is at an angle of 26 degrees to the normal to the plane of the transparent surface, the first bevel being interior to and contiguous with the second bevel.

28. The apparatus of claim 22 wherein the hollow porous frustrum defines a cone having an apex angle, and the apex angle is selected from among the range of between 35 and 75 degrees.

29. The apparatus of claim 28 wherein the apex angle is 54 degrees.

30. The apparatus of claim 22 wherein the porous hollow frustrum has a porosity in the range of from 25% to 35%.

31. The apparatus of claim 22 wherein the frustrum further comprises three layers of 80 mesh stainless steel screen, one layer of 100 mesh stainless steel screen, and two layers of 40 mesh stainless steel screen.

32. The apparatus of claim 22 wherein the frustrum further comprises sintered brass.

33. The apparatus of claim 22 wherein the plenum further comprises a second tube located substantially concentrically within the first tube, the second tube having an exterior dimension less than the interior dimension of the first tube such that the plenum formed between the first and second tubes is substantially annular; and the transparent surface and the narrow opening of the frustrum are substantially circular.

* * * * *

UNITED STATES PATENT AND TRADEMARK OFFICE

CERTIFICATE OF CORRECTION

PATENT NO. : 5,115,342

DATED : May 19, 1992

INVENTOR(S) : Norman R. Rowe and William R. Sweeney

It is certified that error appears in the above-identified patent and that said Letters Patent is hereby corrected as shown below:

| Column | Line | Correction |
|---|---|---|
| 5 | 1 | Delete ", small diameter SD,". |
| 5 | 2 | Insert -- SD -- after "diameter". |
| 6 | 22 | Insert -- to the -- after "normal". |
| 9 | 16 | Change "bounded" to -- transparent --. |
| 9 | 19 | Change "bounded" to -- transparent --. |
| 9 | 36 | Change "bounded" to -- transparent --. |
| 10 | 8 | Change "bounded" to -- transparent --. |

Signed and Sealed this

Twenty-sixth Day of October, 1993

*Attest:*

Bruce Lehman

BRUCE LEHMAN

*Attesting Officer*

*Commissioner of Patents and Trademarks*